United States Patent [19]

Caswell

[11] 4,147,096
[45] Apr. 3, 1979

[54] BREATHER VENT FOR VAPOR VENT VALVE

[75] Inventor: Richard L. Caswell, Salisbury, Md.

[73] Assignee: Dresser Industries, Inc., Dallas, Tex.

[21] Appl. No.: 802,394

[22] Filed: Jun. 1, 1977

[51] Int. Cl.² .............. F23L 17/02; F16K 15/00; F16K 24/00; F16L 55/07

[52] U.S. Cl. .......................... 98/122; 98/83; 137/513.5; 137/533.27; 137/587; 220/374; 220/203

[58] Field of Search .............. 98/59, 83, 122; 220/203, 205, 373, 374; 137/513.5, 533.27, 587, 589; 138/42, 89

[56] References Cited

U.S. PATENT DOCUMENTS

| 179,147 | 6/1876 | Auld | 98/83 |
|---|---|---|---|
| 294,503 | 3/1884 | Persson | 98/122 |
| 1,654,474 | 12/1927 | Wolter | 220/203 |
| 1,957,971 | 5/1934 | Martin | 98/83 |
| 2,157,609 | 5/1939 | Hopkins | 98/83 |
| 2,781,941 | 2/1957 | Lindsay | 98/122 |
| 3,543,670 | 12/1970 | Stone | 98/122 |

Primary Examiner—John J. Vrablik
Attorney, Agent, or Firm—Daniel Rubin

[57] ABSTRACT

A breather vent mountable on the vent pipe outlet from an underground storage tank at a gasoline service station site. A vent housing includes a body section adapted for placement on the vent pipe and which cooperates with a superposed cap section to accommodate a vapor floatable valve disc supported internally thereof. Vapors from the tank can normally discharge in a primary flow path past the valve disc from where it is diverted upwardly by an annular diverging deflector to atmosphere. Displaced apertures having comparatively increased protection against freezeup form an alternative outlet for a secondary flow path diverted downwardly from a location downstream of the valve disc. The latter being better protected against freezing rain, etc. enables continued vent discharge to atmosphere in the event the primary flow path becomes ice blocked.

11 Claims, 5 Drawing Figures

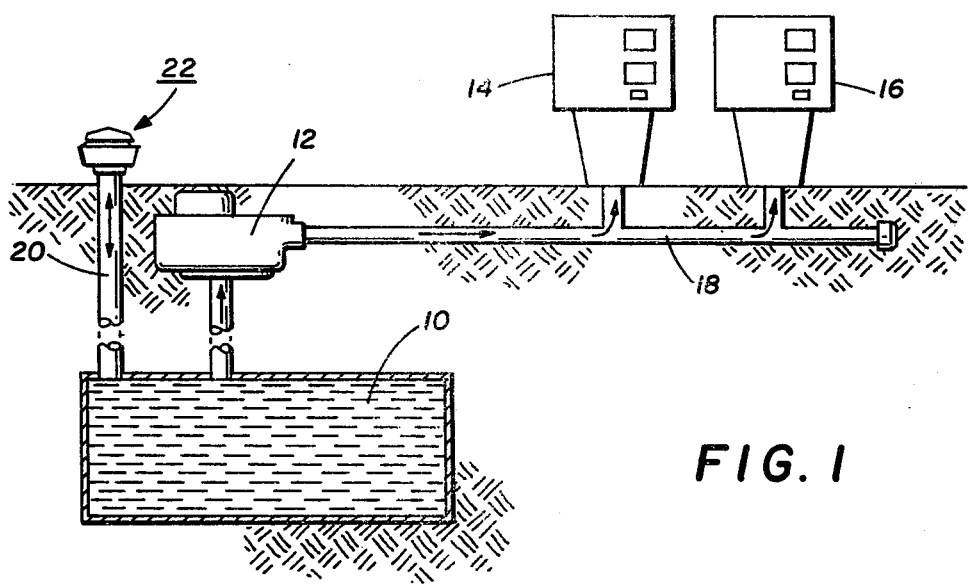
FIG. 1
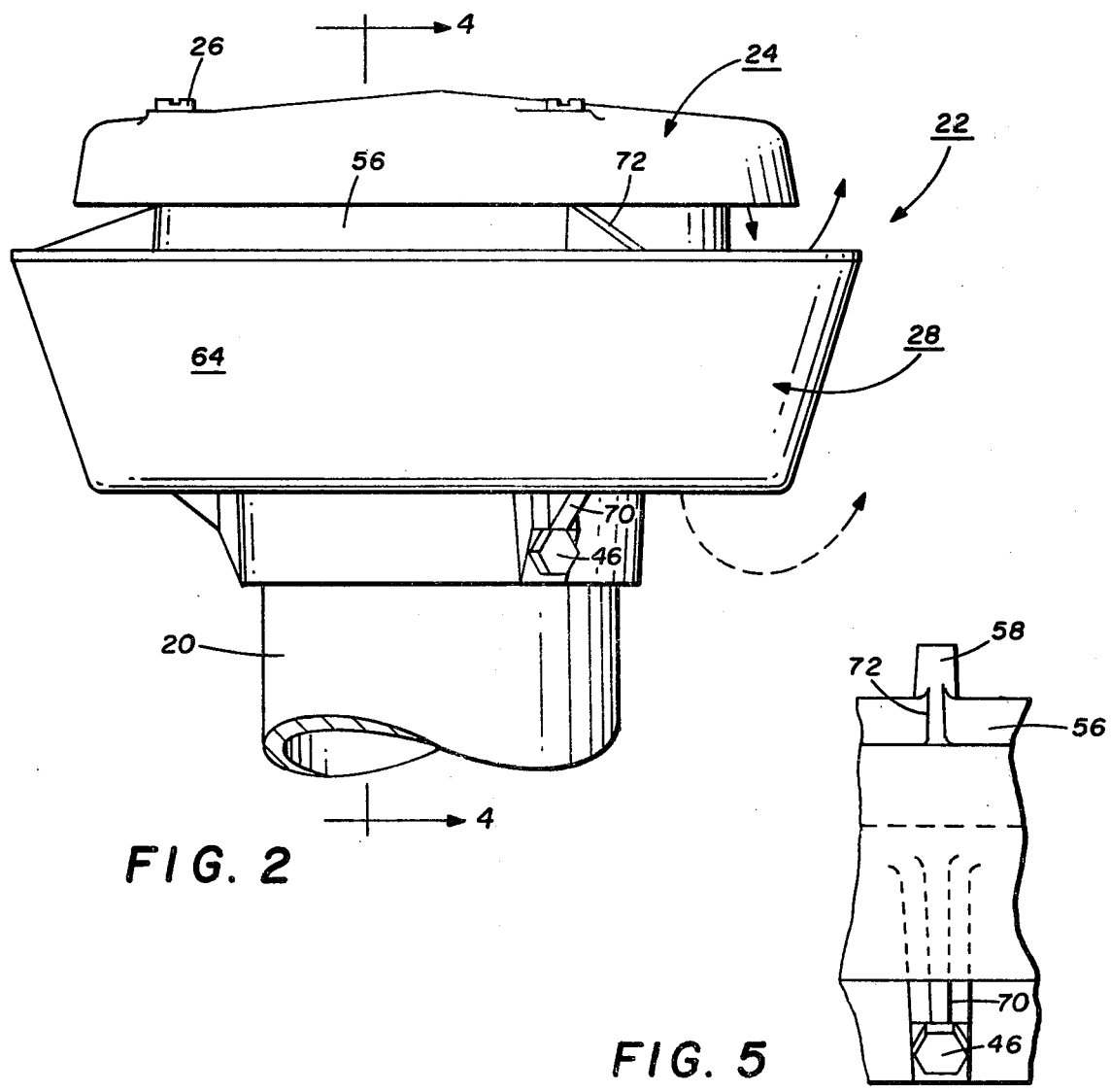
FIG. 2
FIG. 5

BREATHER VENT FOR VAPOR VENT VALVE

CROSS REFERENCE TO RELATED APPLICATIONS

None.

BACKGROUND OF THE INVENTION

1. The field of art to which the invention pertains includes the art of fluid handling with atmospheric venting.

2. Common construction at gasoline service station sites includes an aboveground atmospheric vent for the underground storage tank that enables release of pressurized vapors during fillup or the like, while allowing inbreathing of the tank as tank pressure is reduced. With the advent of vapor recovery systems designed to meet requirements of governing bodies, e.g. California Air Resources Board and Environmental Protection Agency, regulations require a restrictive device in the vent lines for reducing the escape of hydrocarbon vapors therefrom to atmosphere. In order to generally protect the discharge of the restrictive devices from adverse effects of weather, a form of weatherhood or breather vent have customarily been provided. The requirements for such vents are governed by NFPA Code 30-2240 "Vent pipes shall discharge only upward in order to dispense vapors".

Typically, available hoods or vents define a sinuous flow path of sorts from the vent pipe to an outlet reasonably protected by baffles or the like against in-flow of rain or snow. While functioning well under normal weather conditions, including conventional rain and snowfall, it has been found that such prior art hoods and vents fail to vent upwardly and/or tend to become blocked in the event of prolonged freezing rain or snow buildup that produce ice formations over their outlets. This, of course, impairs the venting function of the system, yet despite recognition of the problem a ready solution has not heretofore been known.

SUMMARY OF THE INVENTION

This invention relates to a breather vent apparatus for atmospheric discharge from the vent line of an underground storage tank at a gasoline service station site. More specifically, the invention relates to a novel breather vent for discharging vapor in an upward direction as required by code past a vapor vent valve to atmosphere in a vapor recovery installation at such site. By being better able to maintain venting even under the most severe conditions of weather icing during which ice formations could otherwise curtail or close a customary outlet to atmosphere, continuous reliability of the venting function is assured.

The foregoing is achieved in accordance herewith by a two component breather vent that includes a hollowed body and a more or less concave cap skirted about its periphery. The body and cap cooperate to internally support a vapor floatable vent valve positioned intervening in the flow path from an inlet at the vent pipe to an atmospheric outlet. Under normal weather conditions, the discharging vapors are released through a primary flow path surrounding the valve downstream thereof. Forming the primary flow path downstream of the valve is a lateral web extending from the central body cavity to support an annular deflector extending upward toward the cap skirt to define a shielded reverse curve flow path therebetween leading to atmosphere. From the underside of the deflector depending integrally downward therefrom is an annular skirt forming a downwardly shielded passage open to atmosphere. Via apertures in the connecting web communicating with the latter passage, a secondary more weather protected outlet is defined operably effective in the event the primary flow path becomes ice blocked.

It is therefore an object of the invention to provide an improved breather vent for a vapor vent valve in a vapor recovery installation.

It is a further object of the invention to provide a novel breather vent better able than previously available vents for that purpose to continually maintain its venting function even under the most severe conditions of weather icing.

It is a further object of the invention to effect the last recited object by means of alternately operable flow paths, one of which is effective during normal weather conditions and the other of which is effective under abnormal conditions of weather icing.

It is a still further object of the invention to effect the foregoing objects with a relatively simple yet effective manufacture affording a high level of reliability for tank venting.

BRIEF DESCRIPTION OF THE DRAWINGS

FIG. 1 is a schematic elevation of a gasoline service station site utilizing the breather vent hereof;

FIG. 2 is a side elevation of the breather vent hereof;

FIG. 5 is a fragmentary view as seen substantially from the position 5—5 of FIG. 4.

Figure 3:
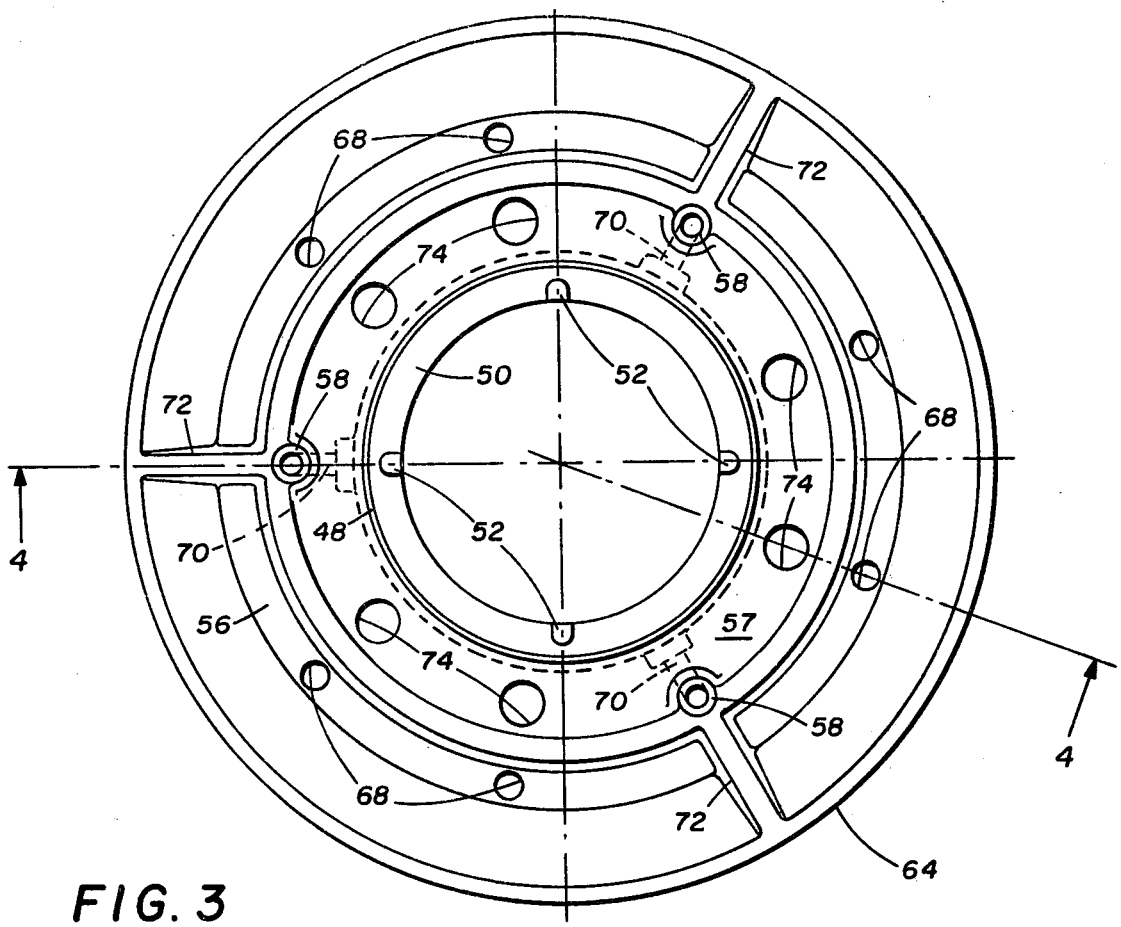
FIG. 3 is a plan view of the body section.

Referring initially to FIG. 1, there is shown an underground gasoline storage tank 10 connected to a vapor recovery system (not shown) and from which a pump (not shown) contained in housing 12 supplies gasoline to dispensers 14 and 16 via underground conduit 18. Upstanding vent pipe 20 from tank 12 terminates aboveground and is capped by a valve containing breather vent 22 in accordance herewith.

Figure 4:
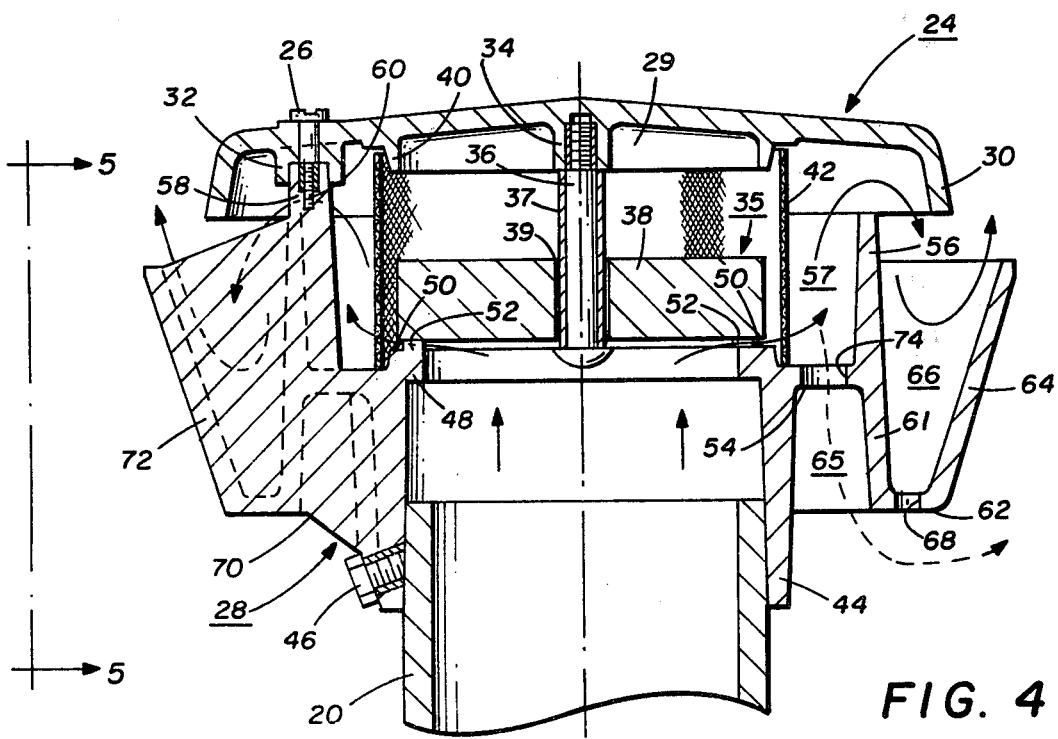
FIG. 4 is a sectional elevation taken substantially along the lines 4—4 of FIGS. 2 and 3.

Referring now to FIGS. 2-5, breather vent 22 in accordance herewith constitutes a housing formed of an upper cap section 24 assembled via a plurality of screws 26 to a lower body section 28 for defining an open cavity 29 therebetween. Cap 24 is more or less concave on its interior and is peripherally formed with a concentric downwardly dependent skirt 30. A plurality of bosses 32 accommodate assembly screws 26 whereas a central boss 34 is adapted for receipt of an elongated screw 36. Screw 36 is enclosed in a nylon sleeve 37 for supporting a suitable vent valve 35 of a commercially available type in cavity 29. Briefly, shown valve 35 is formed of a disc 38 having an aperture 39 to enable upward sliding of the disc over sleeve 37 in response to lifting forces imposed by escaping vapors. A concentric downward dependent tapered flange 40 defines the centering position for a screen sleeve 42 surrounding valve 35.

Body 28 is centrally formed of a tubular center section 44 communicating with cavity 29 and adapted for mounting on the end of vent pipe 20 via a plurality of screws 46 positioned about the periphery. Center tube 44 terminates inwardly at an intermediate location therein at which a horizontal flange 48 having three pads or bosses 52 raised from surface 50 are spaced apart to provide support for valve disc 38 while allowing flow therepast as will be understood.

Connected to tube 44 by means of an integral lateral web 54 is a concentric upstanding deflector wall 56 defining a tapered channel pocket 57 therebetween and distally terminating in a plane coinciding substantially with the bottom plane of cap skirt 30. Displaced bosses 58 extending integrally upward from the wall edge have a threaded aperture 60 to receive assembly screws 26.

Formed extending integrally downward from the underside of deflector wall 56 is an angular or tapered annular dependent wall 61 which in a vee-shaped formation merges with a base 62 joining an upward outwardly tapered annular flange 64. In this configuration there is defined a downside channel pocket 65 open to atmosphere opposite of wall 61 from an upside channel pocket 66. The latter serves as a choke area for preventing downward flow of venting vapors and includes a plurality of drain holes 68. A plurality of radial ribs 70 and 72 displaced about the periphery serve to reinforce the flange structures thereabout.

By means of the foregoing housing arrangement a normally functioning primary flow path for venting vapors is established from pipe 20, past valve 35 and screen 42 to up and over wall 56 in a sinuous reverse curve pattern discharging upward to atmosphere from channel 66 as shown by the arrows thereat. To form a secondary flow path operative in the alternative to the primary flow path web 54 there is included a plurality of arcuately spaced apertures 74 operable as will be explained.

In operation, the assembled housing 22 is first secured in place over vent pipe 20 via bolts 46. Valve 35 is subject to floating movement over sleeve 37 in response to the vapor pressures incurred enabling the discharging vapors to flow over surface 50 in the areas between bosses 52 past valve 35 to outward of screen 42. From that point, the vapors will flow in its path of least resistance which under normal weather conditions is via the primary flow path through channel 57 in a sinuous reverse curve flow pattern over wall 56 to outward past cap skirt 30 and choke pocket 66. Should the primary flow passage beyond wall 56 become icebound from snow, freezing rain or the like, the alternative secondary flow path forms automatically as the path of least resistance from passage 57 by turning downward through apertures 74 into channel 65. With channel 65 being completely protected from either snow or freezing rain, it remains open despite the weather permitting the flow to pass outward under base 62 to atmosphere.

By the above description there has been disclosed a novel breather vent adapted for mounting on the vent pipe of an underground storage tank at a gasoline service station site. Being adapted to accommodate a vapor vent valve utilized in vapor recovery systems for such installations, the vent housing defines both a primary and a secondary flow path, the former of which functions under normal weather conditions and latter of which functions automatically in the event the primary flow path becomes blocked with ice or snow. The secondary flow path, by virtue of its more protected location within the unit, is not susceptible to ice blockage in the manner of the primary flow path such that continued operation of the system even under the most severe conditions of inclement weather is assured. Consequently, the breather vent hereof resolves a long standing problem in assuring upward discharging characteristics under normal operating conditions and reliable performance of such vents under adverse weather conditions in which such vents of the prior art have become icebound and incapacitated.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A breather vent for weather exposed mounting over an upstanding vapor vent pipe from which noxious vapors are to be expelled, said breather vent comprising in combination:
   (a) a hollow body adapted for position mounting over the vent pipe outlet;
   (b) first wall means in said body defining a primary flow path between an inlet adapted to communicate with the vent pipe on which said body is mounted and a primary substantially continuous peripheral outlet oriented for noxious vapor received at the primary flow path inlet to discharge to atmosphere in an upwardly direction;
   (c) first weather shielding means on said body extending over said primary outlet for effecting a degree of weather shielding thereof;
   (d) second wall means in said body defining a secondary flow path between an inlet adapted to communicate with the vent pipe on which said body is mounted and a secondary outlet oriented for noxious vapor received at the secondary flow path inlet to discharge to atmosphere in a downwardly direction;
   (e) second weather shielding means on said body extending over said secondary outlet for effecting a degree of weather shielding thereof relatively greater than afforded said primary outlet by said first weather shielding means; and
   (f) support means for supporting a vapor vent valve at an intermediate location in each of said flow paths;
   whereby said secondary flow path is adapted to function for discharging noxious vapors in the alternative to said primary flow path if weather caused inoperability occurs at said primary outlet.

2. A breather vent according to claim 1 including a vapor vent valve means supported on said support means.

3. A breather vent according to claim 1 in which said primary and secondary flow paths utilize an inlet common to said first and second wall means and defined by a central sleeve in said body adapted for position placement at the outlet of a vent pipe for receiving the vent discharge therefrom.

4. A breather vent according to claim 3 in which said first and second wall means are common to each other from said common inlet to a location downstream of said valve support means at which said flow paths separate for communication with their respective outlets.

5. A breather vent according to claim 4 in which the flow paths at said separation location assume flow directions substantially opposite to each other with the primary flow path discharging at said primary outlet in a generally upward direction and the secondary flow path discharging at said secondary outlet in a comparatively downward direction.

6. A breather vent according to claim 5 in which said hollow body has an internal cavity in the flow paths at an intermediate location between said inlet and said outlets and said support means is located in said cavity for containing a vent valve in a vent operative relation thereat.

7. A breather vent according to claim 5 in which said first wall means includes first baffle means positioned downstream of a valve on said support means for directing flow from past said support means in an upward direction toward primary said outlet.

8. A breather vent according to claim 7 in which said first baffle means extends upstanding and at its distal end cooperates with said first weather shielding means comprising a superposed transversely extending cap to define a sinuous reverse curve flow path past said first baffle means.

9. A breather vent according to claim 8 in which said first baffle means extends annularly about the axis of said cavity radially outward from said support means and said cap includes an annular downwardly dependent skirt about its periphery radially outward of said first baffle means and substantially concentric therewith.

10. A breather vent according to claim 7 in which said second wall means includes second baffle means extending downwardly dependent from the underside of said first baffle means for directing flow in a downward direction toward said secondary outlet and apertures communicating the upstream position of said first baffle means with the upstream position of said second baffle means.

11. A breather vent according to claim 10 in which both said first baffle means and said second baffle means are commonly supported by a lateral web joined to said central sleeve and said apertures extend through said web at displaced locations thereabout.

* * * * *